United States Patent
Synek et al.

(10) Patent No.: US 7,603,441 B2
(45) Date of Patent: Oct. 13, 2009

(54) METHOD AND APPARATUS FOR AUTOMATIC CONFIGURATION OF MULTIPLE ON-CHIP INTERCONNECTS

(75) Inventors: Kamil Synek, Sunnyvale, CA (US); Chien-Chun Chou, San Jose, CA (US); Wolf-Dietrich Weber, San Jose, CA (US)

(73) Assignee: Sonics, Inc., Milpitas, CA (US)

( * ) Notice: Subject to any disclaimer, the term of this patent is extended or adjusted under 35 U.S.C. 154(b) by 631 days.

(21) Appl. No.: 10/330,591

(22) Filed: Dec. 27, 2002

(65) Prior Publication Data

US 2004/0128341 A1    Jul. 1, 2004

(51) Int. Cl.
G06F 15/177 (2006.01)
G06F 13/36 (2006.01)
H04L 12/50 (2006.01)

(52) U.S. Cl. .............. 709/220; 709/221; 709/222; 710/306; 370/401; 370/402

(58) Field of Classification Search ......... 709/220–222; 710/306; 370/401, 402
See application file for complete search history.

(56) References Cited

U.S. PATENT DOCUMENTS

| | | | |
|---|---|---|---|
| 5,784,648 A * | 7/1998 | Duckwall | 710/40 |
| 5,907,697 A * | 5/1999 | Barbier et al. | 716/16 |
| 5,923,860 A | 7/1999 | Olarig | |
| 5,948,089 A | 9/1999 | Wingard et al. | |
| 5,987,541 A | 11/1999 | Hewitt | |
| 6,034,542 A | 3/2000 | Ridgeway | |
| 6,041,400 A | 3/2000 | Ozcelik et al. | |
| 6,085,243 A * | 7/2000 | Fletcher et al. | 709/224 |
| 6,122,664 A | 9/2000 | Boukobza et al. | |
| 6,182,183 B1 | 1/2001 | Wingard et al. | |
| 6,253,243 B1 | 6/2001 | Spencer | |
| 6,330,225 B1 | 12/2001 | Weber et al. | |
| 6,336,138 B1 | 1/2002 | Caswell et al. | |
| 6,449,667 B1 * | 9/2002 | Ganmukhi et al. | 710/28 |
| 6,539,225 B1 | 3/2003 | Lee | |
| 6,549,516 B1 | 4/2003 | Albert et al. | |
| 6,578,117 B2 | 6/2003 | Weber | |
| 6,654,798 B1 | 11/2003 | Skibinski et al. | |
| 6,671,724 B1 | 12/2003 | Pandya et al. | |
| 6,683,474 B2 | 1/2004 | Ebert et al. | |
| 6,718,416 B1 | 4/2004 | Self et al. | |

(Continued)

FOREIGN PATENT DOCUMENTS

EP    1 376 932 A2    1/2004

(Continued)

OTHER PUBLICATIONS

Wingard, Drew: "MicroNetwork-Based Integration for SOCs," Design Automation Conference, Jun. 2001, pp. 673-677.

(Continued)

*Primary Examiner*—Ario Etienne
*Assistant Examiner*—Avi Gold
(74) *Attorney, Agent, or Firm*—Rutan & Tucker LLP

(57) ABSTRACT

A method and apparatus for automatic configuration of multiple on-chip interconnects have been described. In one embodiment, the invention reduces the configuration time of several on-chip network features, and also ensures that these features are configured correctly to minimize errors in a design.

27 Claims, 10 Drawing Sheets

U.S. PATENT DOCUMENTS

| | | |
|---|---|---|
| 6,721,793 B1 | 4/2004 | Corless |
| 6,725,313 B1 | 4/2004 | Wingard et al. |
| 6,766,406 B1 | 7/2004 | Gasperini et al. |
| 6,768,742 B1 * | 7/2004 | Godfrey .................... 370/400 |
| 6,785,256 B2 | 8/2004 | O'Neill |
| 6,785,753 B2 | 8/2004 | Weber et al. |
| 6,795,857 B1 | 9/2004 | Leung et al. |
| 6,804,738 B2 | 10/2004 | Weber |
| 6,804,757 B2 | 10/2004 | Weber |
| 6,816,814 B2 | 11/2004 | Ebert et al. |
| 6,859,931 B1 | 2/2005 | Cheyer et al. |
| 6,880,133 B2 | 4/2005 | Meyer et al. |
| 6,961,834 B2 | 11/2005 | Weber |
| 6,976,106 B2 | 12/2005 | Tomlinson et al. |
| 6,996,112 B2 * | 2/2006 | Fukunaga et al. ........... 370/401 |
| 2002/0046260 A1 | 4/2002 | Day, II |
| 2002/0138287 A1 | 9/2002 | Chen et al. |
| 2002/0138615 A1 | 9/2002 | Schmeling |
| 2002/0141401 A1 | 10/2002 | Albert et al. |
| 2002/0143653 A1 | 10/2002 | DiLena et al. |
| 2002/0169854 A1 | 11/2002 | Tarnoff |
| 2002/0184300 A1 | 12/2002 | Schmeling et al. |
| 2003/0018738 A1 | 1/2003 | Boylan et al. |
| 2003/0069960 A1 | 4/2003 | Symons et al. |
| 2003/0074520 A1 | 4/2003 | Weber |
| 2003/0126192 A1 | 7/2003 | Magnussen |
| 2003/0167144 A1 | 9/2003 | Wang et al. |
| 2003/0208566 A1 | 11/2003 | Weber et al. |
| 2003/0208611 A1 | 11/2003 | Weber et al. |
| 2004/0015961 A1 | 1/2004 | Chefalas et al. |

FOREIGN PATENT DOCUMENTS

| | | |
|---|---|---|
| WO | WO 99/63727 | 12/1999 |
| WO | WO 02/13024 A1 | 2/2002 |

OTHER PUBLICATIONS

Dally, William J., et. al.: "Route Packets, Not Wires: On-Chip Interconnection Networks," Design Automation Conference, Jun. 2001, pp. 684-689.

Wingard, Drew: "Sonics SOC Integration Architecture," Sonics, Inc., 1500 Presentation, 1999, 25 pages, www.OCP-IP.org.

"Open Core Protocol Specification," OCP International Partnership, Release 1.0, 2001.

Chauhan, Pankaj, et. al.: "Verifying IP-Core based System-On-Chip Designs," Apr. 15, 1999, IEEE.

* cited by examiner

METHOD AND APPARATUS FOR AUTOMATIC CONFIGURATION OF MULTIPLE ON-CHIP INTERCONNECTS

FIELD OF THE INVENTION

The present invention pertains to communications. More particularly, the present invention relates to a method and apparatus for automatic configuration of multiple on-chip interconnects.

BACKGROUND OF THE INVENTION

In computer networks, internetworking of homogeneous and/or different networks, tightly coupled and loosely coupled, has been studied and put into practice. With the advance in integrated circuit (IC) technology, on-chip interconnects have emerged and the aggregation of multiple on-chip interconnects into a single, larger on-chip network has attracted interest. Few schemes have been proposed with respect to this matter—with most of the schemes addressing only the connection of non-configurable on-chip interconnects using hard-wired, fixed gateway modules. The hard-wired approach may not meet the requirements of applications demanding optimum area size, best performance, and low power. The use of configurable interfaces may provide a solution in this area, however the manual configuration of large on-chip networks, composed of multiple on-chip interconnects, is quite complex. This presents a problem.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for automatic configuration of multiple on-chip interconnects are described.

Figure 1:
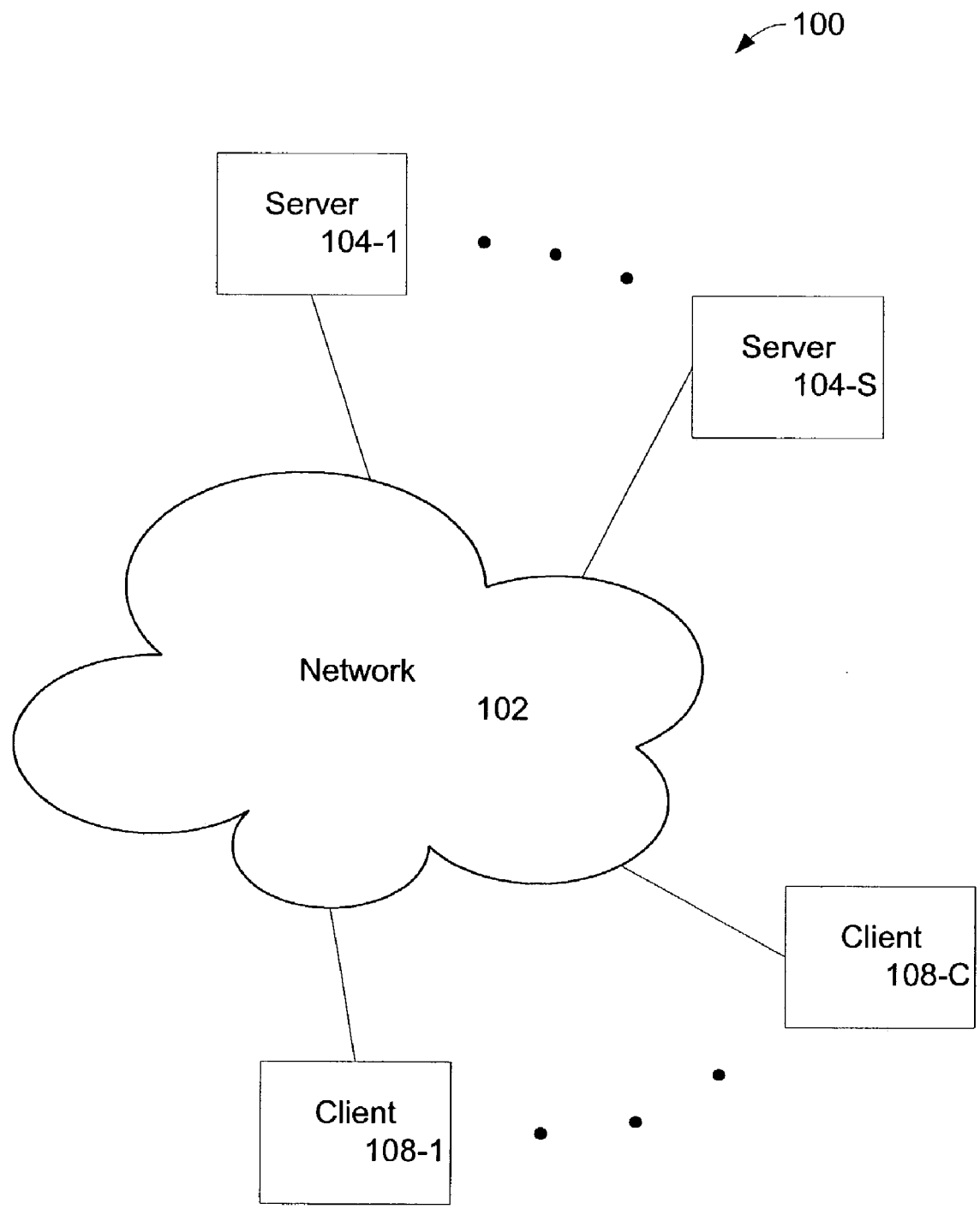
FIG. 1 illustrates a network environment in which the method and apparatus of the invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
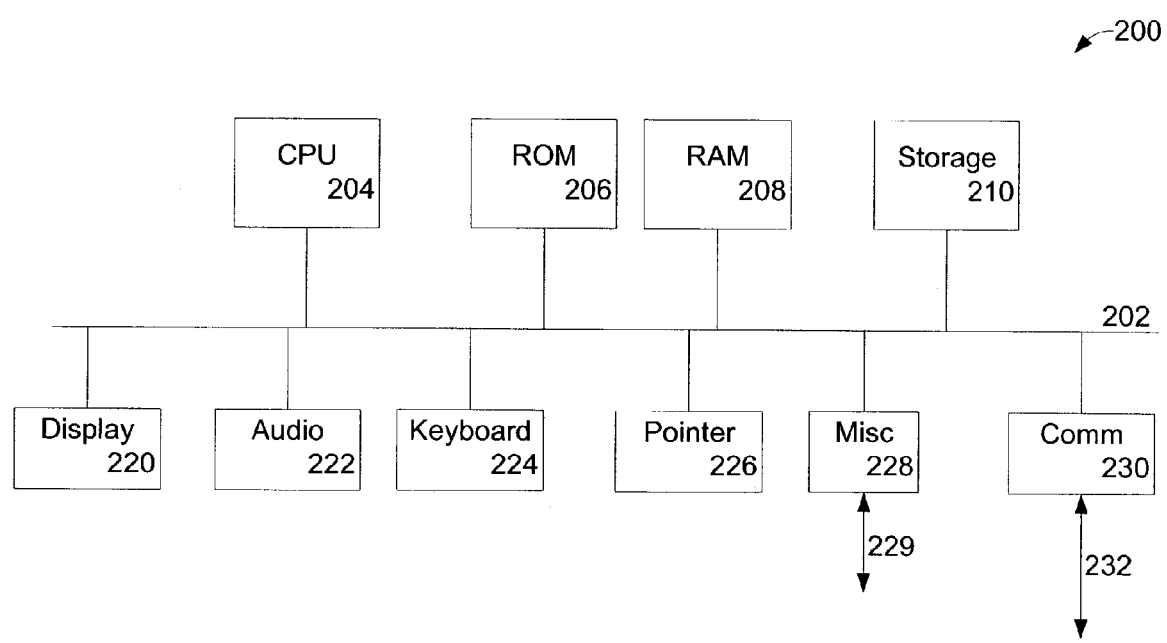
FIG. 2 is a block diagram of a computer system which may be used to implement the invention.

FIG. 2 illustrates a computer system 200 in block diagram form, which may be representative of any of the clients and/or servers shown in FIG. 1. More details are described below.

The manual configuration of the large on-chip network, composed of multiple on-chip interconnects, is quite complex. Automating the configuration process, greatly simplifies and expedites the overall design process.

Figure 3:
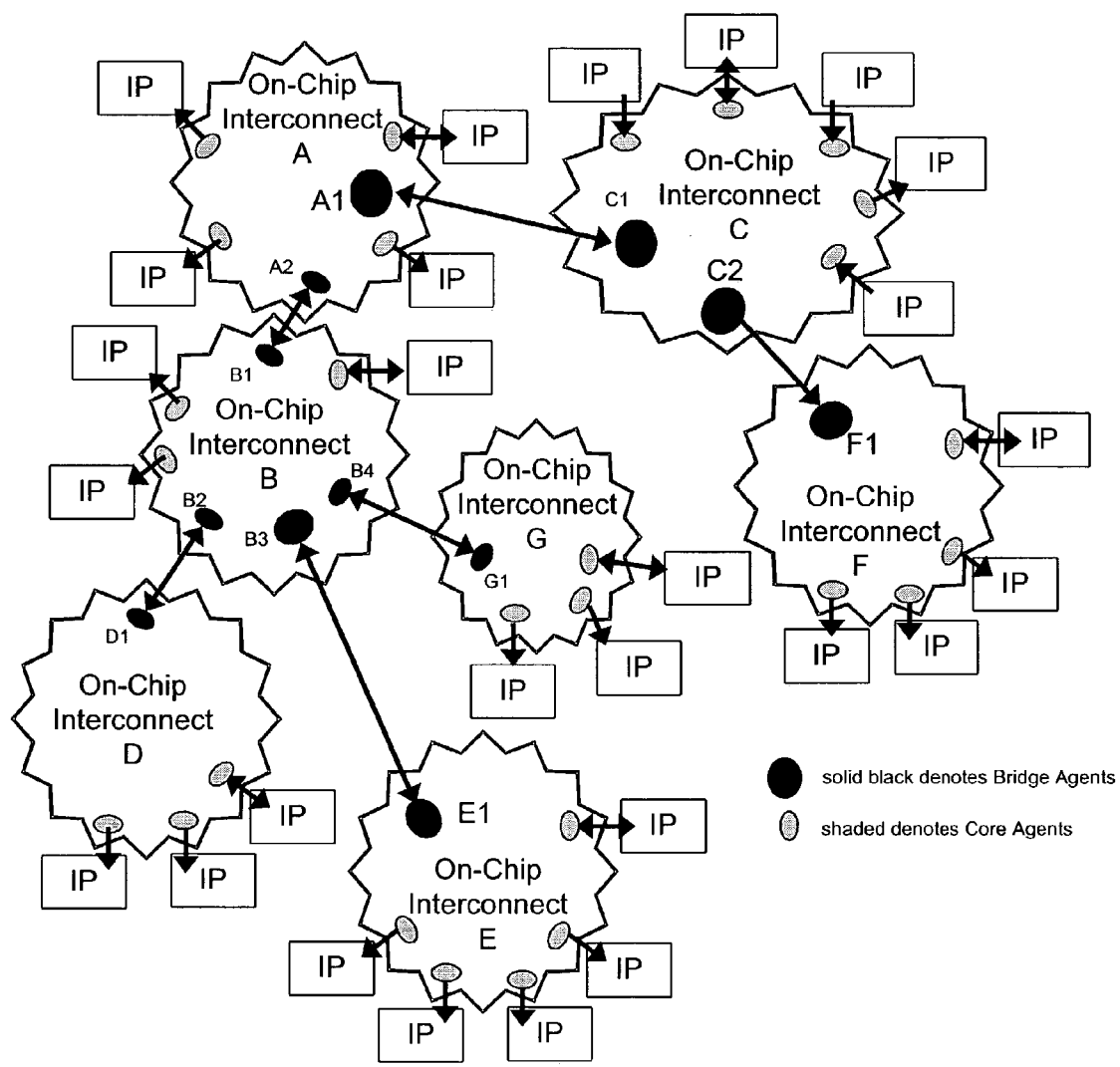
FIG. 3 shows one embodiment of an on-chip network composed of multiple on-chip interconnects.

FIG. 3 shows an on-chip network composed of multiple on-chip interconnects. The communication between the on-chip interconnects is accomplished via bridge agents shown at A1, A2, B1, B2, B3, B4, C1, C2, D1, E1, F1, G1. The configuration of the bridge agents, with respect to the agents' internal features, registers and signals, is quite complex and the automatic configuration process aids the system designer with this process. The automatic configuration process also handles the other type of agents, the core agents. A core agent interfaces between an IP core and the on-chip interconnect. In an embodiment, one or more bridge agents may operate at different frequencies. In an alternative embodiment, one or more agents selected from the group consisting of bridge and core may operate at different frequencies. In FIG. 3, the IP cores are identified with the symbol IP and the core agents are shown as light gray ellipses. The automatic configuration process (denoted as ACx) aids with the configuration of the following system-wide features of the on-chip network:

AC1. Configuration of the bridge agents.
AC2. Configuration of the system address map.
AC3. Configuration and routing of flag signals.
AC4. Configuration and routing of error signals.
AC5. Configuration of reset signals.

Since the system designer may modify the automatically generated configuration, as necessary, checking of the final on-chip network configuration (denoted as CCx) is incorporated as part of the configuration process. The following checks of the on-chip network are performed:

CC1. Correct configuration of the bridge agents.
CC2. Correctness of the network topology: for instance, it must be a fully connected network or a tree.
CC3. Correctness of the address map and the address matching registers within bridge and core agents.
CC4. Correct configuration and routing of error signals between bridge agents.
CC5. Correct configuration and routing of signaling flags.

In the following description, the automatic configuration processes are identified as AC1 through AC5 and the configuration checks as CC1 through CC5.

Figure 4:
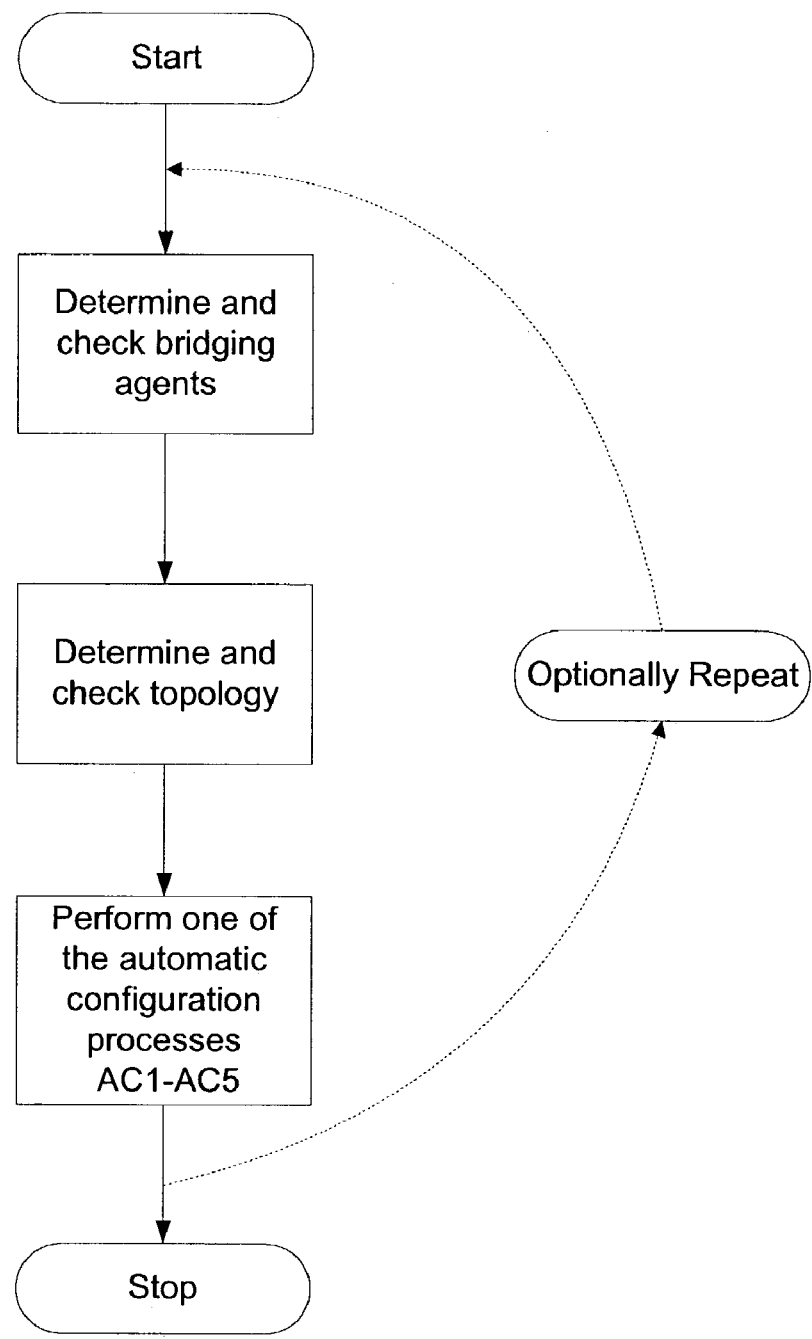
FIG. 4 shows in flowchart form one embodiment of the invention for performing any one of the four automatic configuration processes AC1 through AC5.
Figure 5:
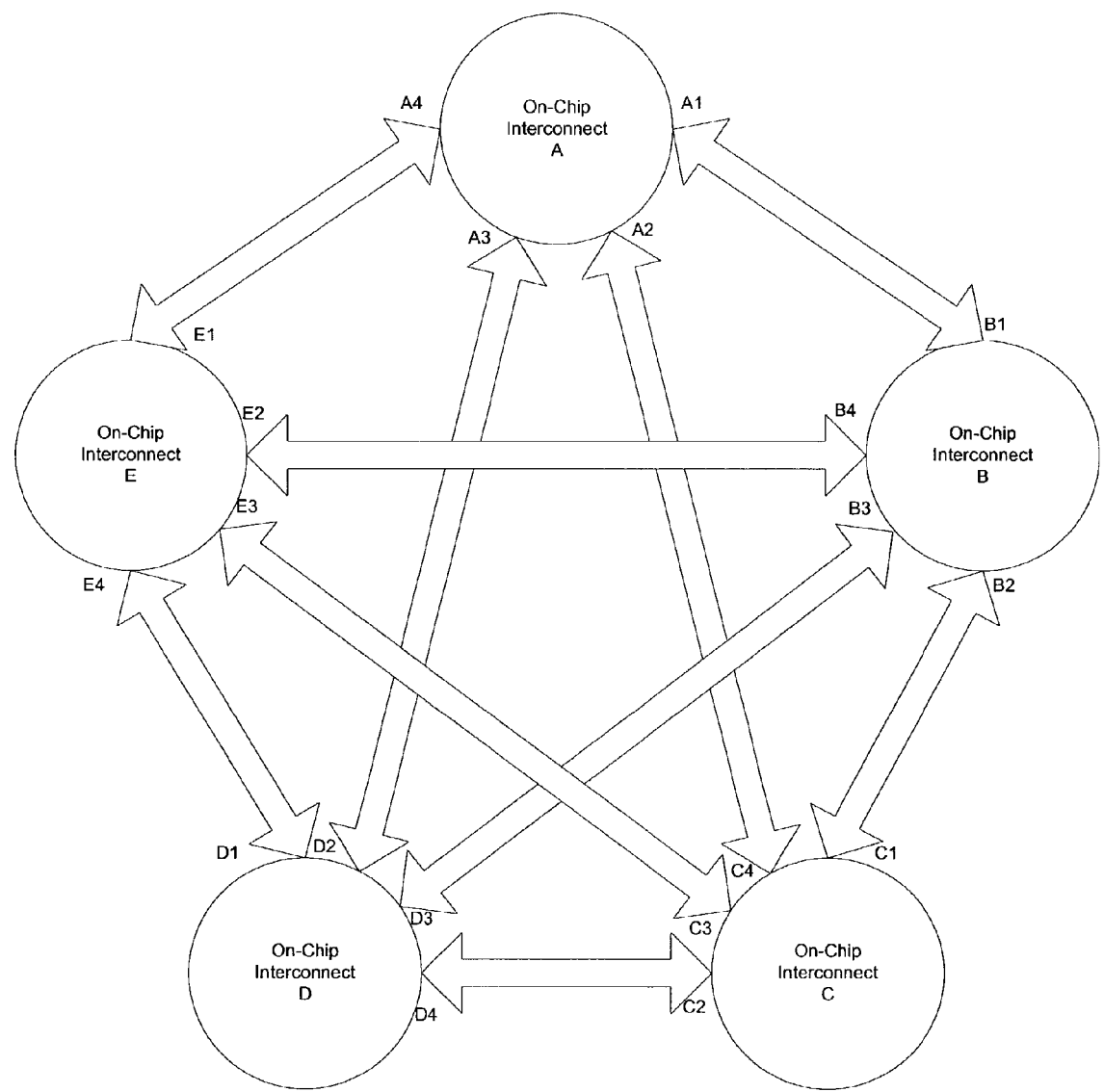
FIG. 5 shows a fully-connected graph that consists of five on-chip interconnects.
Figure 6:
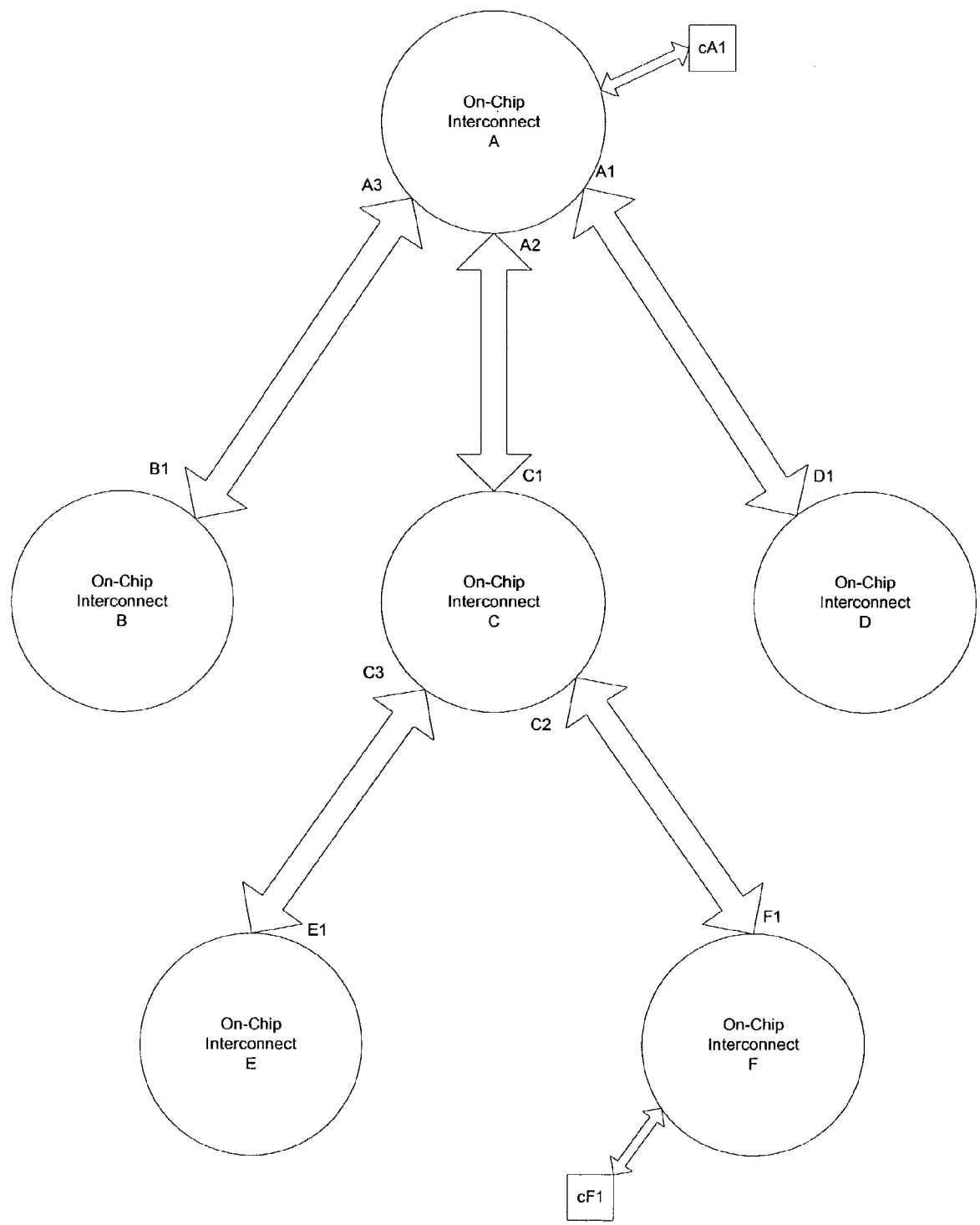
FIG. 6 shows a tree that consists of six on-chip interconnects.

FIG. 4 shows in flowchart form one embodiment of the invention for performing any one of the five automatic configuration processes AC1 through AC5. Because any of the processes may need to be repeated as the designer edits the design, certain things need to be performed before repeating the automatic configuration process. Bridge agents are implemented by altering the configuration of core agents; therefore, one of the first things in the automatic configuration process is to identify the agents that are bridge agents and verify that they properly connect the on-chip interconnects. Next is to determine the design topology and verify that the topology is one of the valid topologies: for instance, a fully-connected graph or a tree. FIG. 5 shows a fully-connected graph that consists of five on-chip interconnects. In a fully-connected graph topology all the on-chip interconnects are connected to each other. FIG. 6 shows a tree that consists of six on-chip interconnects. A tree topology may not have any cycles (i.e. the topology needs to be a DAG—directed acyclic graph). There are no restrictions on the layout of the tree or the number of edges at each node. After determining the design topology, one of the automatic configuration processes AC1 through AC5 may be performed.

Figure 7:
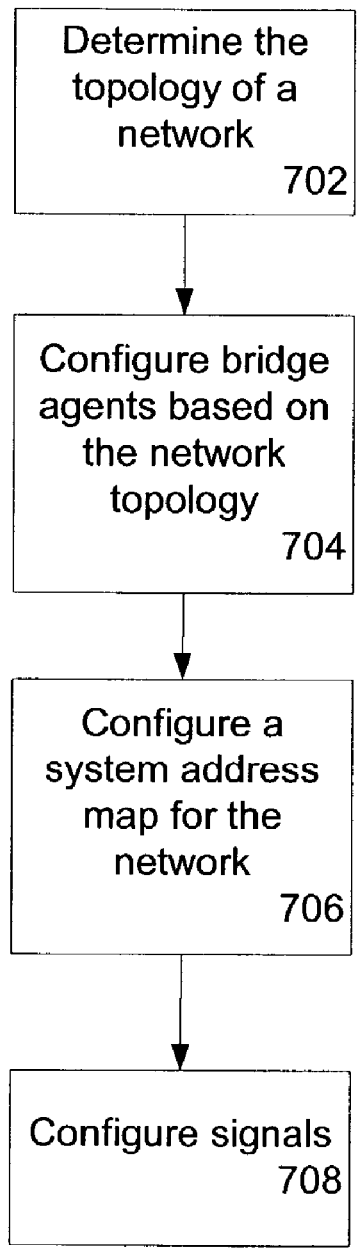
FIGS. 7, 8, 9, and 10 show in flowchart form various embodiments of the invention.

FIG. 7 illustrates one embodiment of the invention where the network topology is determined 702, bridge agents are configured based on the network topology 704, a system address map is configured for the network 706, and signals are configured 708.

Figure 8:
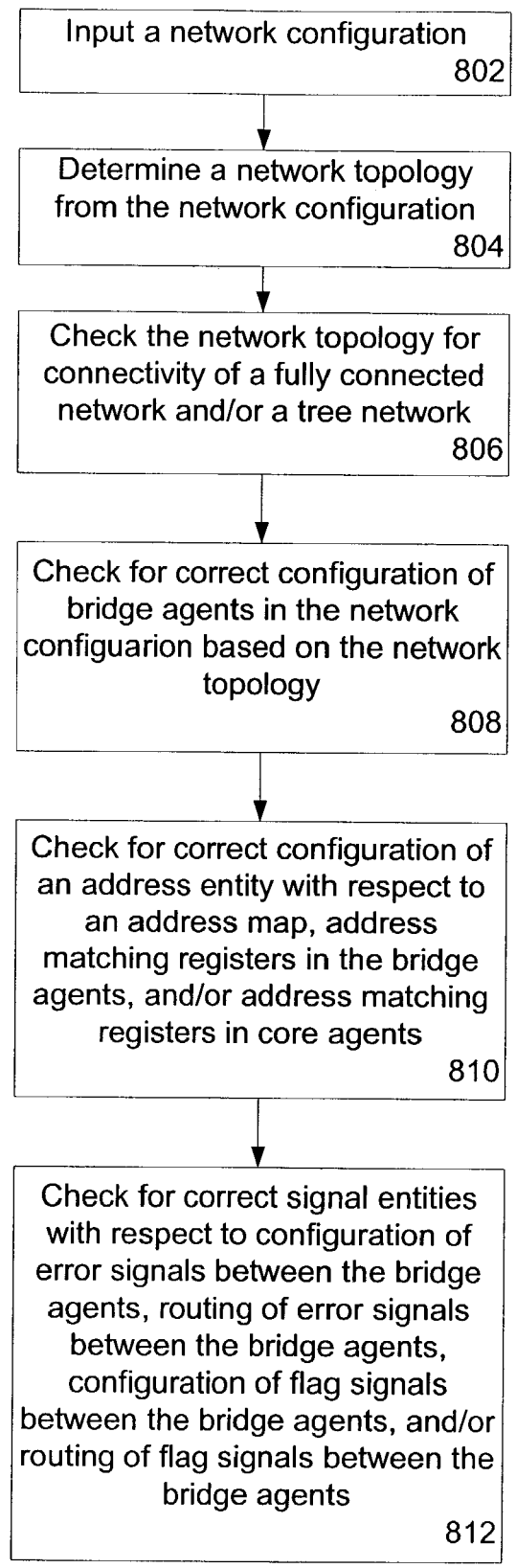

FIG. 8 illustrates one embodiment of the invention where a network configuration is input 802. Next, a network topology is determined from the network configuration 804. The network topology is checked for connectivity based on a fully connected network configuration and/or a tree network configuration 806. Bridge agents are then checked for correct configuration based on the network topology 808. Address entities are checked for correct configuration with respect to an address map, and/or address matching registers in bridge agents and/or core agents 810. Signal entities are checked for correctness of configuration of error signals between bridge agents, the routing of the error signals between the bridge agents, configuration of the flag signals between the bridge agents, and/or routing of the flag signals between the bridge agents 812.

Figure 9:
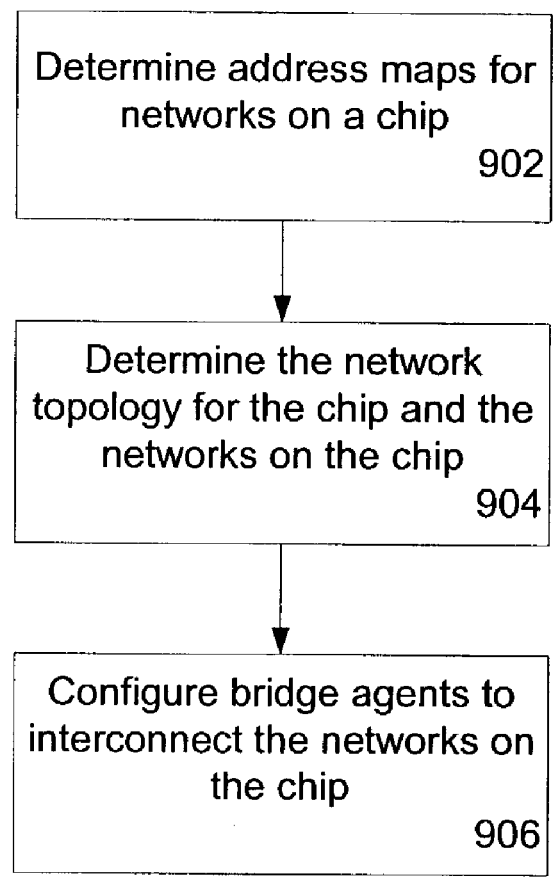

FIG. 9 illustrates one embodiment of the invention where address maps are determined for networks on a chip 902, the topology of the chip and the networks on the chip are determinted 904, and then bridge agents are configured to interconnect the networks on the chip 906.

Figure 10:
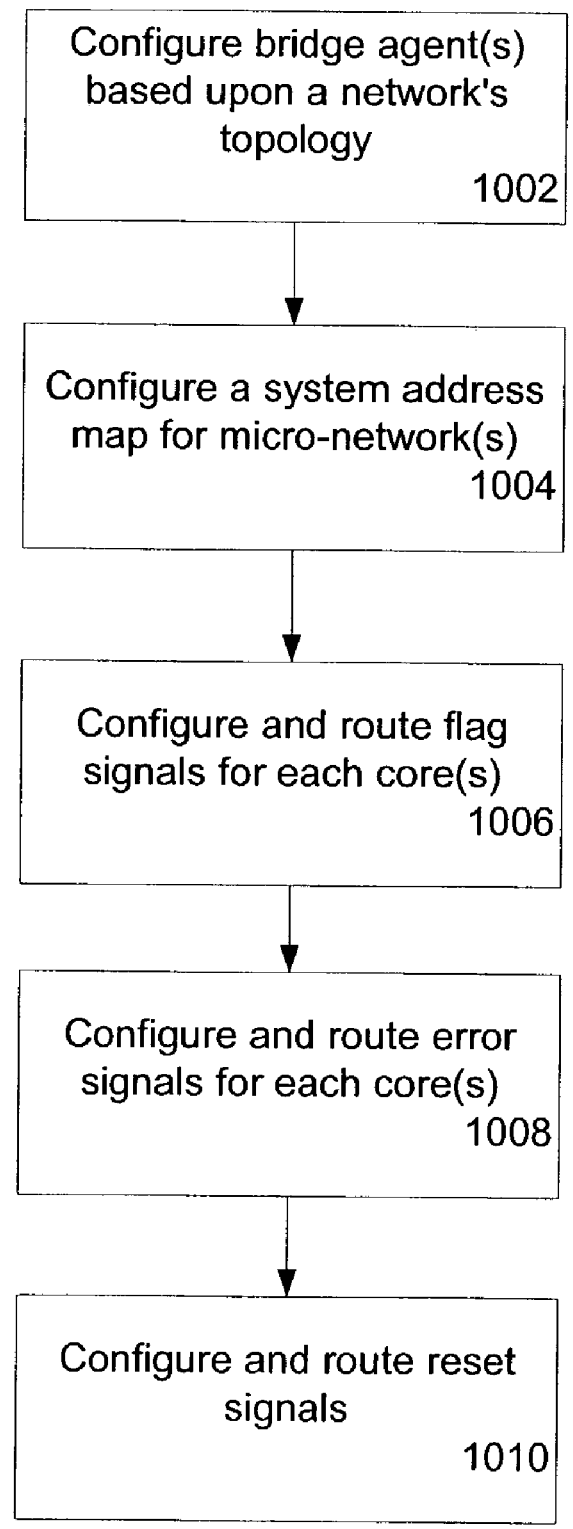

FIG. 10 illustrates one embodiment of the invention where one or more bridge agents are configured based upon the network's topology 1002. Next, a system address map is configured for one or more micro-networks 1004. Flag signals are configured and routed for each core or cores 1006, error signals are configured and routed for each core or cores 1008, and reset signals are configured and routed. In an embodiment, entities selected from the group consisting of one or more bridge agents, one or more micro-networks, and one or more cores may operate at differing clock frequencies.

AC1. Configuration of the Bridge Agents.

This process configures the internal features and register values of the bridge agent. It may also configure the signals that interface between two on-chip interconnects. Table 1 shows one embodiment of configuration features and parameters that may need to be configured in a bridge agent, such as the agent A1 in FIG. 3. Table 2 shows one embodiment of configuration features and parameters of an interface between two bridge agents (such as the interface between A1 and C1 in FIG. 3)

TABLE 1

Bridge Agent Configuration

| Feature Name | Parameter Name | Parameter Value | Description |
| --- | --- | --- | --- |
| Bridge Forwarding | bridge | True | Identifies the agent as a bridge: True for a bridge agent; False otherwise. |
| | bridge_forward | True for a tree topology | Specifies whether the bridge agent forwards internal requests to its external interface port: True for a tree topology; False for a fully connected topology. |
| Component Identification | vendor_code | Sonics | Identifies the vendor of the component. This value resides in a hardware register. |
| | component_code | Bridge | Identifies the component category. This value resides in a hardware register. |
| | revision_code | 0 | Identifies the revision of the component. This value resides in a hardware register. |
| Connection Identifier Support | sbconnid | Disabled | Specifies whether the agent generates connection identifiers to identify requests. |
| Error Handling | sbmerrmode | see AC4 | Specifies whether the agent drives the on-chip network's master error signal. |
| | sbserrmode | see AC4 | Specifies whether the agent drives the on-chip network's slave error signal. |
| | sberr0mmode | see AC4 | Specifies whether the on-chip network drives the agent's master error signal. |
| | sberr0smode | see AC4 | Specifies whether the on-chip network drives the agent's slave error signal. |
| Interrupt Mapping | interrupt_vector interrupt_flag | Disabled | Specifies the mapping of external interrupt signals into internal signals of the on-chip interconnect. Bridge agents do not forward interrupt signals. |
| Software Generated Reset | sbreset | Disabled | Specifies whether the agent activates the Reset signal. Allows software generated reset of the agent and the attached core. This feature is disabled in bridge agents. |
| Timeout of Requests | timeout_enable | False | Specifies whether a target agent allows timeouts. Timeouts are disabled in bridge agents. |

TABLE 2

Bridge Interface Configuration

| Feature Name | Parameter Name | Parameter Value | Description |
|---|---|---|---|
| Address Space Extension | addrspace | Disabled | Enables or disables the MAddrSpace signal which indicates the address region of a transfer. |
| Byte Enable Extension | byteen | Enabled | Enables or disables the MByteEn signal which indicates the bytes within the data word that are part of the current transfer. |
| Burst Extension | burst | Enabled | Enables or disables the MBurst signal which specifies the burst transaction type. |
| Connection Identifier Extension | connid | Enabled | Enables or disables the MConnID signal which carries the connection identifier of the current request. |
| | connid_wdth | User Definable | The width of the MConnID signal. |
| Data Handshake Extension | datahandshake | Enabled | Enables or disables the MData Valid and SDataAccept signals which indicate "write data valid" and "slave accepts write data" conditions. |
| | respaccept | Disabled | Enables or disables the MRespAccept signal which indicates whether the master accepts the current response from the slave. |
| Thread Extension | threads | User Definable | Specifies the number of threads and enables or disables the MThreadID, SThreadID, and MDataThreadID signals. |
| | mthreadbusy | Disabled | Enables or disables the MThreadBusy signal which allows the master to notify the slave that it cannot accept any responses associated with certain threads. |
| | sthreadbusy | Enabled if threads > 1 | Enables or disables the SThreadBusy signal which allows the slave to notify the master that it cannot accept any new requests associated with certain threads. |
| Write Response Extension | writeresp_enable | Enabled | Configures the interface to include responses for write-type commands. |
| Flag Extension | mflag | see AC3 | Enables or disables the master flag signals. |
| | mflag_wdth | see AC3 | Specifies the width (number) of master flag signals |
| | sflag | see AC3 | Enables or disables the slave flag signals. |
| | sflag_wdth | see AC3 | Specifies the width (number) of slave flag signals. |
| Error Extension | merror | see AC4 | Enables or disables the master error signal MError. |
| | serror | see AC4 | Enables or disables the slave error signal SError. |
| Control and Status Extension | control | Disabled | Enables or disables the Control, ControlWr, and ControlBusy signals which carry control information. |
| | status | Disabled | Enables or disables the Status, StatusRd, StatusBusy signals which carry status information. |

AC2. Configuration of the System Address Map.

Cores connected to each on-chip interconnect may present memory to the rest of the system that is accessed by specifying system addresses. Agents may also provide registers that are accessed by specifying system addresses and so appear to exist in the system address space. To ensure that requests are forwarded to the right cores according to the system address, agents may contain address matching logic, which the designer configures by assigning regions from the overall system address space to agents that interface with cores that contain memory. Table 3 shows an example of an address map for agents that interface with cores that have memory. The region size, start, and end are expressed as hexadecimal numbers (base 16). The first row specifies a 64K address region in Agent0. This region does not include configuration registers. The second row specifies a 256 byte address region for the configuration registers of Agent0. The third row specifies a 65,280 (0xFF00) byte hole; that is, an unmatched and unmapped address region. The fourth row specifies a 64K address region in Agent1 that includes the agent's configuration registers.

TABLE 3

System Address Map

| Agent Name | Address Region Name | Registers Present | Address Region Size | Address Region Start | Address Region End |
|---|---|---|---|---|---|
| Agent0 | Memory0 | No | 0x10000 (64K) | 0x0 | 0x0FFFF |
| Agent0 | Registers0 | Yes | 0x100 (256) | 0x10000 | 0x100FF |
| Hole | N/A | N/A | 0xFF00 | 0x10100 | 0x1FFFF |
| Agent1 | Memory1 | Yes | 0x10000 (64K) | 0x20000 | 0x2FFFF |

The concept of defining address map regions for agents is extended to apply to on-chip interconnects. The on-chip interconnect may be thought of as covering a region in the system address space that encompasses the regions of all the agents (cores) that are connected to it. The address region for an on-chip interconnect may be overspecified to allow for future extension (i.e. adding additional agents (cores) to an on-chip interconnect without re-configuring the overall system address map). This concept extension allows a top-down specification and configuration of the system address map. Table 4 shows an example system address map for the five on-chip interconnects shown in FIG. 5. In this example, two mega-bytes (2 MB) are reserved for each on-chip interconnect. The designer defines the overall system address map similar to the example in Table 4. The on-chip interconnect address map may be viewed as purely conceptual and may not have a hardware representation; however, the hardware bridge agent address matchers are automatically configured from this address map.

TABLE 4

On-Chip Interconnect Address Map.

| On-Chip Interconnect Name | Address Region Size | Address Region Start | Address Region End |
|---|---|---|---|
| A | 0x200000 (2 MB) | 0x0 | 0x1FFFFF |
| B | 0x200000 (2 MB) | 0x200000 | 0x3FFFFF |
| C | 0x200000 (2 MB) | 0x400000 | 0x5FFFFF |
| D | 0x200000 (2 MB) | 0x600000 | 0x7FFFFF |
| E | 0x200000 (2 MB) | 0x800000 | 0x9FFFFF |

As the designer connects new cores to the on-chip interconnects, the automatic configuration process, AC2 ensures that the address matchers of the cores' interface agents are configured correctly based on the on-chip interconnect address map. For example, if the on-chip interconnect C is not connected to any cores and the designer connects a new 64 KB memory core Core1 to the on-chip interconnect C via agent Agent1, AC2 automatically configures the address matcher of Agent1 to start at the address 0x400000. AC2 also handles the configuration of the bridge agents.

The AC2 process may be broken down into these cases:
1. Configuration of bridge agents (agents that interface on-chip interconnects).
    1.1. Configuration of a fully-connected topology.
    1.2. Configuration of a tree topology.
2. Configuration of core agents (agents that interface cores to on-chip interconnects).

A C2-1. Configuration of Bridge Agents.

AC2-1.1. Configuration of a Fully Connected Topology.

In a fully connected topology, an on-chip interconnect's (such as A in FIG. 5) bridge agent (A2) forwards requests to its immediate neighbor, bridge agent C4 of on-chip interconnect C. In a fully connected topology, all the on-chip interconnects are connected to each other so that requests are forwarded and routed throughout the whole network. Using the on-chip interconnects A and C as an example, bridge agent A2 must forward requests to the on-chip interconnect C, so the address matchers of A2 must match the address space of C. Vice-versa, the address matchers of C4 must match the address space of A. This relationship between the address matchers of a bridge agent and the address space of an on-chip interconnect to which it connects, exists for any pair of bridge agent and on-chip interconnect.

Given the on-chip interconnect address map (an example of which is shown in Table 4), the configuration algorithm processes pairs of bridge agent and on-chip interconnect (such as (A2, C)) and for each bridge agent copies the address map information from the on-chip interconnect. A consideration that the algorithm may take into account is that the bridge agent registers reside in the address space of the bridge agent's on-chip interconnect. For example, the registers of bridge agent A2 reside in the address space of the on-chip interconnect A, but the memory access requests forwarded through A2 address the address space in the on-chip interconnect C.

AC2-1.2. Configuration of a Tree Topology.

In a tree topology, a request may need to be forwarded through several on-chip interconnects in order to reach the on-chip interconnect that it is intended for. Using FIG. 6 as an example, a request generated in the on-chip interconnect B may need to be forwarded to A, it may need to be forwarded to C via A, to D via A, to E via A and C; and to F via A and C. So, the address matchers of the bridge agent B1 need to match the address space of all the other on-chip interconnects: A, C, D, E, and F. This applies to all the other bridge agents.

In one embodiment, for each bridge agent, the algorithm accumulates the address regions of all the other on-chip interconnects that it may need to forward requests to. Since address matcher sizes may be represented as powers of two, the algorithm merges the accumulated address regions and divides them into power-of-two sized regions. The algorithm also deals with bridge agent configuration registers as explained in AC2-1.1.

AC2-2. Configuration of Core Agents.

This configuration process ensures that core agents fit into the appropriate address space based on which on-chip interconnect they are connected to. This process uses the on-chip interconnect address map to determine which address space the core agent fits into. Using the on-chip interconnect address map, the algorithm examines all the core agent address matchers and the address matchers of bridge agent configuration registers and it relocates any address matchers that are not in the correct address space based on which on-chip interconnect the agent is connected to. Using FIG. 5 and Table 4 as an example, if a core agent is connected to on-chip interconnect C, its address matchers must fit into the address region between 4 MB and 6 MB (0x400000 to 0x5FFFFF). Also the default address matcher starting address of any newly added core agents will be relocated to the correct address region.

AC3. Configuration and Routing of Flag Signals.

Cores that are connected to on-chip interconnects via core agents may communicate with each other via flag signals. A master core may communicate with a slave core or another master core via designated flag signals. For example, the master core drives the master flag signal and the slave core samples it; or the slave core drives the slave flag signal and the master core samples it. The on-chip interconnect supplies a number of configurable flag signals that may be used for this purpose. When the cores that communicate via flag signals are connected to the same on-chip interconnect, the designer simply connects the flag signals of the involved cores to the appropriate on-chip interconnect flag signal. When the communicating cores are connected to different on-chip interconnects the appropriate flag signals need to be routed between the on-chip interconnects. In more complex designs that consist of several on-chip interconnects, the flag signals may need to be forwarded from one on-chip interconnect via several intermediate on-chip interconnects to the final destination on-chip interconnect. Using FIG. 6 as an example, if a core cA1 (connected to on-chip interconnect A) communicates with core cF1 (connected to on-chip interconnect F) via master flag 0; the master flag 0 needs to be forwarded from on-chip interconnect A to F via C. For a design that consists even of three on-chip interconnects, where several flags need to be routed between several cores that are connected to different on-chip interconnects, the manual process of correctly routing the flags can be involved, tedious and error prone. The configuration process AC3 provides a significant time savings for a designer and ensures that the signals are routed correctly.

In one embodiment, the first part of the algorithm for AC3 is to build a map of the paths between the on-chip interconnects. The map includes the names of the bridge agents through which the signals must be routed. An example path map for FIG. 6 is shown in Table 5. The first row and column label the on-chip interconnects and each cell contains the names of the agents that forward signals from one on-chip interconnect to the other. Only the bridge agents that leave an on-chip interconnect are stored in the map. The other bridge agent that enters the on-chip interconnect is not stored, since every bridge agent knows the other bridge agent that it is connected to. The path from an on-chip interconnect to itself is illegal and therefore those cells are empty.

TABLE 5

Example Path Map for FIG. 6.

| | | | TO | | |
|---|---|---|---|---|---|
| FROM | A | B | C | D | E | F |
| A |  | A3 | A2 | A1 | A2, C3 | A2, C2 |
| B | B1 |  | B1, A2 | B1, A1 | B1, A2, C3 | B1, A2, C2 |
| C | C1 | C1, A3 |  | C1, A1 | C3 | C2 |
| D | D1 | D1, A3 | D1, A2 |  | D1, A2, C3 | D1, A2, C2 |
| E | E1, C1 | E1, C1, A3 | E1 | E1, C1, A1 |  | E1, C2 |
| F | F1, C1 | F1, C1, A3 | F1 | F1, C1, A1 | F1, C3 |  |

For fully-connected design topologies, AC3 must avoid forwarding loops of the flag signals. This may be accomplished by selecting one of the trees that is embedded in the fully connected graph. Using FIG. 5 as an example, one such tree could be A→E→D→C→B, where A is at the top of the tree and B at the bottom. The path map is then constructed for that tree.

The system designer defines how the cores in the system communicate via the flag signals. For example, in FIG. 6, core cA1 communicates with core cF1 via master flag 0 and slave flag 0. The rest of the AC3 algorithm analyzes the flag usage and connections, and using the path map configures the appropriate bridge agents to forward the appropriate flag signals. For this example, using Table 5, the bridge agents A2, C1, C2, and F1 are configured to forward the master flag 0 and slave flag 0. The bridge agents are configured to connect the interface flag signals to the on-chip interconnect flag signals using the mflag and sflag parameters shown in Table 2. After all the flag signals are allocated and routed, the mflag_wdth and sflag_wdth parameters of bridge agent interfaces described in Table 2 are set based on how many signals each interface carries.

AC4. Configuration and Routing of Error Signals.

In one embodiment the bridge agents may forward two sets of error signals: master error signals that send error status from master cores to slave cores and slave error signals that send error status from slave cores to master cores. Each on-chip interconnect carries both signals and the bridge agents are configured to forward these signals between all the on-chip interconnects. When connecting cores to on-chip interconnects, the system designer decides which cores will be connected to the error signals by appropriately configuring the core agents to connect to the on-chip network error signals. The process AC4 automatically configures the bridge agents to route the error signals through all the on-chip interconnects.

The algorithm is similar to AC3, with the exception that a different set of configuration parameters is involved. For fully connected topologies, an acyclic path through all the on-chip interconnects is found. The resulting on-chip network tree is traversed and the bridge agents that form the edges of the tree are configured to forward the error signals to the immediately neighboring on-chip interconnect. In fully connected topologies, the bridge agents that are not in the acyclic path tree do not forward the error signals. The parameters involved in the configuration of error signals are: sbmerrmode, sbserrmode, sberr0mmode, sberr0smode (described in Table 1); and merror, serror (described in Table 2).

AC5. Configuration of Reset Signals.

AC5 configures the system so that one of the on-chip interconnects may accept an external asynchronous reset, synchronizes it with the system clock and distributes the synchronous reset throughout the network to the other on-chip interconnects. Also, the reset signals of the bridge agent interfaces described in Table 2 are configured so that the on-chip network that comes out of reset last drives the reset across the bridge.

CC1. Checking Bridge Agent Configuration.

In one embodiment, this check verifies that the parameters of bridge agents are configured according to the specifications in Tables 1 and 2.

CC2. Checking Network Topology.

In one embodiment, the bridge agents are identified and the network topology is verified as either a fully connected network or a tree. The algorithm computes a transitive closure of all the bridge connection relations. The topology is initially unknown until a cycle is detected. If a cycle is detected, the topology is a possibly fully connected graph. The possibly fully connected graph is verified by checking that all of its nodes are connected; otherwise it is a topology in error. If a cycle is not detected, the topology is possibly a tree. The possible tree is verified by checking that all of its nodes are reachable; otherwise it is a topology in error.

CC3. Checking the Address Map.

In one embodiment, CC3 verifies the integrity of the system address map by checking the address regions specified in the agent's address matchers. Example checks are listed below. In the following checks, the address matchers for bridge agent registers are treated similar to the address matchers of core agents.

Fully connected topologies
    The address matchers of bridge agents that connect to the same on-chip interconnect must match the same address space. For example, B1, C4, D2, E1 in FIG. 5.
    The address matchers of the core agents must be within the address region covered by the bridge agent from the other on-chip networks. For example, in FIG. 5, core agents connected to E must be covered by A4, B4, C3, and D1.

Tree topologies
    The address matchers of bridge agents that directly connect two on-chip networks must match mutually exclusive address regions. For example, in FIG. 6, A1 and D1, A2 and C1, A3 and B1, C2 and F1, C3 and E1.
    The address matchers of the core agents must be within the address region covered by the bridge agent that forwards requests to the core's on-chip network. For example, in FIG. 6, the bridge agent A2 must cover the core agents connected to C, E, and F.

All topologies
    The address matchers of any two core agents should not overlap.

CC4. Check Error Signal Configuration.

In one embodiment, CC4 verifies that the bridge agents are configured correctly to bridge the master error and slave error signals. Example checks are listed below:

- Parameter integrity: the parameters sbmerrmode, sbserrmode, sberr0mmode, sberr0smode, mflag, and sflag are set correctly to either bridge the error signals or to not bridge the error signals.
- If one bridge drives the master error signal, the bridge on the other side drives the slave error signal and vice-versa.
- If one bridge does not bridge the error signals, the bridge on the other side does not bridge the error signal.
- A tree topology should not have any breaks in the bridging of the error signals: the error signals should reach all the on-chip networks.
- A fully connected topology should not have any cycles in the bridging of the error signals.

CC5. Check Flag Signal Configuration.

In one embodiment, CC5 verifies that the bridge and core agents are configured correctly to bridge the flag signals. The algorithm is similar to CC4. Example checks are listed below:

- Parameter integrity: verifies that interface parameters are set correctly.
- A flag should be driven by one of the core agents.
- A flag should be sampled by some core agent. This is only a warning.
- A fully connected topology should not have any cycles in the bridging of the flag signals.
- For each flag, a connection should exist between the core agent driver and the core agent receiver of the flag.

Thus, what has been disclosed is a method and apparatus for automatic configuration of multiple on-chip interconnects.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several systems in the form of S servers 104-1 through 104-S and C clients 108-1 through 108-C are connected to each other via a network 102, which may be, for example, an on-chip communication network. Note that alternatively the network 102 might be or include one or more of: inter-chip communications, an optical network, the Internet, a Local Area Network (LAN), Wide Area Network (WAN), satellite link, fiber network, cable network, or a combination of these and/or others. The servers may represent, for example: a master device on a chip; a memory; an intellectual property core, such as a microprocessor, communications interface, etc.; a disk storage system; and/or computing resources. Likewise, the clients may have computing, storage, and viewing capabilities. The method and apparatus described herein may be applied to essentially any type of communicating means or device whether local or remote, such as a LAN, a WAN, a system bus, on-chip bus, etc. It is to be further appreciated that the use of the term client and server is for clarity in specifying who initiates a communication (the client) and who responds (the server). No hierarchy is implied unless explicitly stated. Both functions may be in a single communicating device, in which case the client-server and server-client relationship may be viewed as peer-to-peer. Thus, if two devices such as 108-1 and 104-S can both initiate and respond to communications, their communication may be viewed as peer-to-peer. Likewise, communications between 104-1 and 104-S, and 108-1 and 108-C may be viewed as peer to peer if each such communicating device is capable of initiation and response to communication.

Referring back to FIG. 2, FIG. 2 illustrates a system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as an on-chip bus, a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of the system, the system may include some, all, more, or a rearrangement of components in the block diagram. For example, an on-chip communications system on an integrated circuit may lack a display 220, keyboard 224, and a pointer 226. Another example may be a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

The term IP as used in this document denotes Intellectual Property. The term IP, may be used by itself, or may be used with other terms such as core, to denote a design having a functionality. For example, an IP core or IP for short, may consist of circuitry, buses, communication links, a microprocessor, etc. Additionally, IP may be implemented in a variety of ways, and may be fabricated on an integrated circuit, etc.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "communicating" or "displaying" or the like, can refer to the action and processes of a computer system, or an electronic device, that manipulates and transforms data represented as physical (electronic) quantities within the electronic device or computer system's registers and memories into other data similarly represented as physical quantities within the electronic device and/or computer system memories or registers or other such information storage, transmission, or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), digital versatile disk (DVD), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer. However, the computer readable storage medium would not include non-tangible embodiments (i.e. electrical, optical, acoustical, or other forms of propagated signals.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network. This communications network is not limited by size, and may range from, for example, on-chip communications to WANs such as the Internet.

The methods of the invention may be implemented using computer software. If written in a programming language conforming to a recognized standard, sequences of instructions designed to implement the methods can be compiled for execution on a variety of hardware platforms and for interface to a variety of operating systems. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; etc.

Thus, a method and apparatus for automatic configuration of multiple on-chip interconnects have been described.

What is claimed is:

1. A method comprising:
an automatic configuration of a plurality of on-chip interconnects of an on-chip network, including,
determining a topology of the on-chip network wherein the determined topology is a directed acyclic graph tree or a fully connected graph;
configuring a plurality of bridge agents and core agents in the on-chip interconnects to communicate with each other based on said topology by configuring each of the plurality of on-chip interconnects with an address region that covers a region in system address space that encompasses the address regions of all core agents that are connected to the on-chip interconnect, where a first bridge agent is configured to communicate from a first on-chip interconnect to a second on-chip interconnect;
configuring a system address map of said network, wherein the first bridge agent and the core agents have address matching components inside the agent and check a correctness of an address by matching the address to the system address map; and
configuring a plurality of signals communicated between components in the on-chip network.

2. The method of claim 1 wherein said plurality of signals are selected from the group consisting of flag signals, error signals, and reset signals.

3. The method of claim 1 wherein one or more of said plurality of bridge agents are operating at different frequencies.

4. The method of claim 1 wherein the configuring each of the interconnects comprises:
configuring an address matcher of the first bridge agent associated with the first on-chip interconnect.

5. The method of claim 1 wherein the first on-chip interconnect is not connected to any cores and then a designer of the on-chip network connects a new core to the first interconnect via the first bridge agent of the first on-chip interconnect, and then the software process automatically configures an address matcher of the first bridge agent with an address region for accessing the new core.

6. A machine-readable medium having stored thereon instructions, which when executed by a machine to perform the method of claim 1.

7. A method comprising:
determining a plurality of address maps for a plurality of networks on a chip;
determining a network topology for said chip and said plurality of networks as being a directed acyclic graph tree or a fully connected graph;
configuring a system address map of said network, wherein bridge and core agents have address matching components inside the agents and check a correctness of an address by matching the address to the system address map; and
configuring a plurality of bridge agents and core agents in a plurality of on-chip interconnects in said chip to communicate with each other, by configuring each of the plurality of on-chip interconnects with an address region that covers a region in system address space that encompasses the address regions of all core agents that are connected to the on-chip interconnect.

8. The method of 7 wherein said bridge agents each has a configuration feature selected from the group consisting of bridge forwarding, component identification, connection identifier support, error handling, interrupt handling, software generated reset, and timeout of requests.

9. The method of 7 wherein said bridge agents each has an interface feature selected from the group consisting of address space extension, byte enable extension, burst extension, connection identifier extension, data handshake extension, thread extension, write response extension, flag extension, error extension, control extension, and status extension.

10. The method of 7 wherein an address map of a specific one of said plurality of bridge agents includes an address map of a network to which said specific bridge agent is attached and an address map to all other attached networks.

11. The method of 10 wherein one or more of said plurality of bridge agents directly connected to each other have mutually exclusive address regions.

12. The method of 10 wherein said plurality of core agents have address regions that do not overlap.

13. A machine-readable medium having stored thereon instructions, which when executed by a machine to perform the method of claim 7.

14. A processing system comprising a processor coupled to a memory, said memory storing a set of instructions, which when executed said set of instructions performing the method of claim 7.

15. A method for configuring on-chip network connections, the method comprising:
configuring one or more bridge agents and core agents in a plurality of on-chip interconnects of an on-chip network to communicate with each other over the interconnects based upon said on-chip network's topology being a fully connected graph or a directed acyclic graph tree;
configuring and routing flag signals on a per core basis for one or more cores between components in the on-chip network;
configuring and routing error signals on a per core basis for one or more cores between components in the on-chip network;
configuring said one or more bridge agents with respective address matchers with an address region that covers a region in system address space that encompasses address regions of all core agents that are connected to the on-chip interconnect of which the one or more bridge agents are a part; and
configuring and routing reset signals between components in the on-chip network.

16. The method of claim 15 further comprising differing dock frequencies for entities selected from the group consisting of said one or more bridge agents, one or more micro-networks, and said one or more cores.

17. The method of claim 15 wherein a system address map encompasses all address regions of all said one or more bridge agents in possible communication with each other on said on-chip network.

18. The method of claim 15 further comprising:
taking into account that a specific one or more bridge agents' register resides in a same address space as a first bridge agent of the one or more bridge agents' on-chip interconnect.

19. The method of claim 15 wherein said one or more bridge agents that are not in a acyclic path tree of said network's topology do not forward said error signals.

20. The method of claim 15 further comprising wherein any said reset signals routed to said one or more bridge agents are configured such that a specific micro-network, associated with a first bridge agent of the one or more bridge agents, that comes out of a reset last drives a reset across a connecting agent bridge.

21. The method of claim 15 wherein address matchers for said one or more bridge agents that directly connect two on-chip networks match mutually exclusive address regions.

22. The method of claim 15 wherein for any network topology address matchers of any two core agents do not overlap.

23. The method of claim 15 wherein if a first bridge agent of the one of said one or more bridge agents (A) does not bridge a first error signal of the one of said error signals (E) then a second bridge agent of the one or more bridge agents (B) connected to the first bridge agent (A) also does not bridge said first error signal of the one or more error signals (E).

24. A machine-readable medium having stored thereon instructions, which when executed by a machine to perform the method of claim 15.

25. A processing system comprising a processor coupled to a memory, said memory storing a set of instructions, which when executed said set of instructions performing the method of claim 15.

26. An apparatus comprising:
a processor that executes instructions; and
a memory device that stores said instructions, said instructions comprising:
means for automatic configuration of a plurality of on-chip interconnects of an on-chip network, including,
means for determining a topology of the on-chip network as being a fully connected graph or a directed acyclic graph;
means for configuring a plurality of bridge agents and core agents in the on-chip interconnects to communicate with each other based on said topology by configuring each of the plurality of on-chip interconnects with an address region that covers a region in system address space that encompasses the address regions of all core agents that are connected to the on-chip interconnect; and
means for configuring routing of a reset signal between interconnects, from one of the plurality of bridge agents in the on-chip network to another one of the bridge agents.

27. The apparatus of claim 26 further comprising:
means for checking said configuration of the routing of the reset signal.

* * * * *

UNITED STATES PATENT AND TRADEMARK OFFICE
CERTIFICATE OF CORRECTION

PATENT NO. : 7,603,441 B2
APPLICATION NO. : 10/330591
DATED : October 13, 2009
INVENTOR(S) : Synek et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1012 days.

Signed and Sealed this

Fifth Day of October, 2010

David J. Kappos
*Director of the United States Patent and Trademark Office*